United States Patent
Fukaya et al.

(10) Patent No.: US 8,354,022 B2
(45) Date of Patent: Jan. 15, 2013

(54) ADSORBENT, METHOD FOR RECOVERING AN ORGANIC MATTER AND METHOD FOR RECOVERING AN OIL

(75) Inventors: Taro Fukaya, Nerima-ku (JP); Shinetsu Fujieda, Kawasaki (JP); Shinji Murai, Sagamihara (JP); Akiko Suzuki, Tokyo (JP); Hideyuki Tsuji, Yokohama (JP); Tatsuoki Kohno, Tokyo (JP); Nobuyuki Ashikaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 12/708,846

(22) Filed: Feb. 19, 2010

(65) Prior Publication Data
US 2010/0224566 A1   Sep. 9, 2010

(30) Foreign Application Priority Data
Mar. 9, 2009   (JP) ................................ 2009-055010

(51) Int. Cl.
*B01D 35/06*   (2006.01)
(52) U.S. Cl. ........ 210/222; 210/223; 210/690; 210/695; 210/925

(58) Field of Classification Search ................. 210/222, 210/223, 690, 695, 925
See application file for complete search history.

(56) References Cited

U.S. PATENT DOCUMENTS
2009/0277843 A1   11/2009   Fukaya et al.
2009/0314717 A1   12/2009   Fujieda et al.

FOREIGN PATENT DOCUMENTS
| JP | 53-67694 | 6/1978 |
|---|---|---|
| JP | 60-97087 | 5/1985 |
| JP | 7-102238 | 4/1995 |
| JP | 2000-176306 | 6/2000 |

OTHER PUBLICATIONS
Office Action issued Feb. 28, 2012 in Japanese patent Application No. 2009-055010 (with English translation).
U.S. Appl. No. 12/708,899, filed Feb. 19, 2010, Fukaya, et al.

*Primary Examiner* — Chester Barry
(74) *Attorney, Agent, or Firm* — Oblon, Spivak, McClelland, Maier & Neustadt, L.L.P.

(57) ABSTRACT

An adsorbent includes: at least one of an inorganic particle and a metallic particle as a core; at least two kinds of polymers, which cover a surface of the core, with respective different surface tensions; and a convex-concave surface structure formed due to a difference in surface tension between the at least two kinds of polymers.

20 Claims, No Drawings

ADSORBENT, METHOD FOR RECOVERING AN ORGANIC MATTER AND METHOD FOR RECOVERING AN OIL

CROSS-REFERENCE TO THE INVENTION

This application is based upon and claims the benefit of priority from the prior Japanese Patent Application No. 2009-055010, filed on Mar. 9, 2009; the entire contents of which are incorporated herein by reference.

BACKGROUND OF THE INVENTION

Field of the Invention

The present invention relates to an adsorbent for recovering an organic matter such as an organic compound and an oil from a water.

Recently, the effective utilization of water source is required because of the industrial development and the population growth. In this point of view, it is very important to reuse a waste water such as an industrial waste water. The reuse of the waste water can be realized by purifying the waste water, that is, separating other contents from the waste water except the water.

Various methods are known as a method for separating other contents from a liquid. For example, membrane separation, centrifugal separation, activated carbon adsorption, ozone treatment, agglomeration and suspended matter removal with adsorbent can be exemplified. The use of such a method as mentioned above can remove chemical materials such as a phosphorous component and a nitrogen component contained in a water which affect the environment remarkably, and can remove an oil and a clay dispersed in the water.

Among the separating methods as mentioned above, the membrane separation is one of the most commonly used separating methods, but may be likely to be suffer from the clogging of the fine pores of the membrane in the case of the removal of the oil dispersed in the water, causing the disadvantage that the lifetime of the membrane is shortened. In this point of view, the membrane separation is not appropriate for the removal of the oil from the water. As a method for removing the oil such as a heavy oil, therefore, such a removing method as collecting the heavy oil floating on the water surface with an oil boom provided on the water surface which utilize the floating property of the heavy oil, adsorbing and recovering the floating heavy oil is utilized. Alternatively, such a removing method as laying hydrophobic materials with adsorptivity for the heavy oil on the water surface, adsorbing and recovering the floating heavy oil is utilized.

Recently, in this point of view, such an attempt as using an oil adsorbent is made. Concretely, the oil adsorbent is immersed in the water containing the oil dispersed therein so as to adsorb the oil and then, the oil adsorbent with the adsorbed oil is removed from the water. For example, Reference 1 teaches that an oil adsorbent made of magnetic particles and organic contents such as resins provided on the corresponding surfaces of the magnetic particles is used so as to adsorb and remove the oil from the water. In this method, however, the dispersion of the oil adsorbent is not excellent so that the oil adsorbent tends to be settled down or floated on the water surface. Therefore, the oil cannot be adsorbed and removed efficiently and effectively by the oil adsorbent.

Moreover, Reference 2 teaches that the oil is adsorbed by the adsorbing polymer as an oil adsorbent which is made of a hydrophilic block and a hydrophobic block, and the adsorbing polymer with the adsorbed oil is removed from the water. In this method, however, the separation between the adsorbing polymer and the water is difficult and more, the adsorbing polymer with the adsorbed oil is softened, causing the deterioration of workability.

On the other hand, Reference 3 teaches that the oil is adsorbed by the magnetized adsorbing particles so that the adsorbing particles with the adsorbed oil are separated by means of magnetic force. For example, the surfaces of the magnetic particles are modified by stearic acid so that the oil in the water is adsorbed and recovered by the magnetic particles. In this method, however, since the surfaces of the magnetic particles are modified by stearic acid or coupling agent of low molecular weight, the low molecular weight component may contaminate the water adversely.

With all of the removing methods as described in References 1 to 3, since the oil adsorbent is disposed after the adsorption of the oil, the use efficiency of the oil adsorbent is low. Moreover, if the oil adsorbent is not up to standard, the oil adsorbent is disposed as it is. In this point of view, the use efficiency of the oil adsorbent is deteriorated. As a result, a relatively large amount of oil adsorbent is required in order to adsorb and remove the oil to be removed, resulting in the increase in cost relating to the oil removing operation inherently.

Moreover, it is generally known that an organic compound such as an interfacial active agent is adsorbed by an activated carbon. However, it is difficult to reuse the activated carbon after the adsorption of the organic compound because the activated carbon must be settled down and separated from the water under the condition of the addition of an aggregating agent. As described previously, if the magnetic adsorbent is employed, the magnetic adsorbent can be reused because the magnetic adsorbent can be separated from the water without the use of an aggregating agent. In order to enhance the adsorbing efficiency, however, fine pores must be formed at the surface of the magnetic adsorbent, but the forming method of the fine pores cannot be realized as of now.

[Reference 1] JP-A 60-097087 (KOKAI)
[Reference 2] JP-A 07-102238 (KOKAI)
[Reference 3] JP-A 2000-176306 (KOKAI)

BRIEF SUMMARY OF THE INVENTION

An aspect of the present invention relates to an adsorbent, including: at least one of an inorganic particle and a metallic particle as a core; at least two kinds of polymers, which cover a surface of the core, with respective different surface tensions; and a convex-concave surface structure formed due to a difference in surface tension between the at least two kinds of polymers.

Another aspect of the present invention relates to a method for recovering an organic matter, including: recovering an organic matter in a water using the adsorbent.

Still another aspect of the present invention relates to a method for recovering an oil, including: recovering an oil in a water using the adsorbent.

DETAILED DESCRIPTION OF THE INVENTION

Hereinafter, the present invention will be described in detail.

(Adsorbent)

The adsorbent in this embodiment is made of an aggregation of a plurality of adsorbent particles. Each particle is configured such that at least one of an inorganic particle and a metallic particle constitutes a core and a polymer covers the core. Since the inorganic particle and the metallic particle constitutes the core of the adsorbent particle, the inorganic particle and the metallic particle is selected from materials which are not almost chemically changed when the inorganic particle and the metallic particle are immersed in a water for a short period of time.

For example, the material may be a ceramic material such as molten silica, crystalline silica, glass, talc, alumina, silicate calcium, calcium carbonate, barium sulfate, magnesia, silicon nitride, boron nitride, aluminum nitride, magnesium oxide, beryllium oxide or mica, or a metallic material such as aluminium, iron, copper or an alloy thereof. Alternatively, the material may an oxide such as magnetite containing a metallic material listed above, titanic iron, magnetic pyrite, magnesia ferrite, cobalt ferrite, nickel ferrite or barium ferrite.

In view of the advantage of the collection of the adsorbent, it is desired that the inorganic particle and the organic particle contain a magnetic material.

Although the magnetic material is not limited, it is desired that the magnetic material exhibits ferromagnetism at around room temperature. However, a magnetic material commercially available such as iron, alloy containing iron, magnetite, titanic iron, magnesia ferrite, cobalt ferrite, nickel ferrite or barium ferrite may be employed.

Among them, the ferrite-based compound can exhibit the intention of the present invention effectively. For example, since the magnetite ($Fe_3O_4$) is not expensive and stable as a magnetic material by itself and in water, the magnetite can be easily and preferably employed for the water treatment.

In this embodiment, the inorganic particle and the organic particle may be constituted from a magnetic substance. In this case, the magnetic substance is a magnetic powder, and the shape of the magnetic powder may be set in the form of sphere, polyhedron or amorphous, but not be limited. The desired particle size and shape of the magnetic powder may be appropriately set in view of the manufacturing cost. The sphere form or the polyhedral form with round corners is preferable as the form of the magnetic particle.

If the magnetic particle has a sharp edge, the polymer layer covering the magnetic particle as the core of the adsorbent may be damaged so that the shape of the adsorbent cannot be maintained as it is. Normal plating treatment such as Cu plating or Ni plating may be conducted for the magnetic particle as occasion demands. Moreover, the surface of the magnetic particle may be treated so as to prevent the corrosion of the magnetic particle.

The magnetic substance may be constituted from the combination which is made by combining the magnetic particles with a binder such as a resin instead of constituting the magnetic substance directly as the magnetic powder. Namely, the configuration of the magnetic substance is not particularly limited if the magnetic substance generates the magnetic force enough to collect the adsorbent containing the magnetic substance.

The size of the magnetic powder is changed on various conditions such as the density of the magnetic powder, the kind and density of the polymer covering the magnetic powder as the core, and the kind and amount of functional group. In this embodiment, however, the average diameter of the magnetic powder is set within a range of 0.05 to 100 µm and preferably within a range of 0.2 to 5 µm. The average diameter is measured by means of laser diffraction. Concretely, the average diameter is measured with the SALD-DS 21 type measuring apparatus (trade name) made by Shimadzu Corporation.

If the average diameter of the magnetic powders is set larger than 100 µm, the size of the aggregated particle containing the magnetic powders becomes too large so that the dispersion of the aggregated particle in water tends to be deteriorated in the recovery of the oil. Moreover, the effective surface of the aggregated particle is decreased so that the adsorbing amount of the oil tends to be undesirably decreased. If the average diameter of the magnetic powders is set less than 0.05 µm, the magnetic powders as primary particles are aggregated densely so that the surface of the thus obtained resin complex tends to be undesirably decreased. The resin complex is made through the aggregation of the magnetic particles covered with the respective resin layers.

The preferable average diameter of the magnetic powders can be applied for the inorganic particles such as ceramic particles and the non-magnetic metallic particle. The application of the preferable average diameter for the inorganic particles and the non-magnetic metallic particles can exhibit the same effect/function as the application of the preferably average diameter for the magnetic powders.

In this embodiment, the polymer covering the core of the adsorbent which is made of the inorganic particle or the like is constituted from at least two kinds of polymers with respective different surface tensions. In this case, since the polymer with smaller surface tension is attracted for the polymer with larger surface tension, a convex-concave structure is formed at the surface of the adsorbent. Therefore, since the effective surface of the adsorbent is increased, the adsorbable amount of the oil can be increased.

The attraction between the polymers due to the difference in surface tension is caused in the manufacturing process of the adsorbent as will described below. Concretely, the attraction between the polymers due to the surface tension difference is caused when the polymers are precipitated on the inorganic particles through the volatilization of a solvent after the inorganic particles or the like constituting the corresponding cores and the polymers are solved in the solvent. Therefore, the "surface tension" of the polymer means a surface tension at the precipitation of the polymer.

The difference in surface tension between the at least two kinds of polymers is preferably set within a range of 1 mN/m to 40 mN/m. In this case, the above-described effect/function is enhanced to easily form the convex-concave structure with a sufficient large size on the surface of the adsorbent. Concretely, the width (pitch) of the convex-concave structure is set within a range of 10 nm to 1000 nm and the depth of the convex-concave structure is set within a range of 10 nm to 1000 nm. Therefore, the effective surface of the adsorbent can be sufficiently increased so that the adsorbable amount of the oil can be also sufficiently increased.

In this embodiment, it is desired the at least two kinds of polymers are constituted from respective polymers listed as Group A and Group B:

Group A: a polymer containing as a main structure at least one selected from the group consisting of styrene, butadiene, isoprene, ethylene, propylene Group B: at least one polymer selected from the group consisting of acrylic nitrile polymer, alkyl methacrylate polymer, alkyl acrylate polymer, polyacetal, polyvinyl butyral, polyamide, polyester, polyvinyl ether.

If the use of the listed polymers can cause the difference in surface tension between the selected polymers to be set within the preferable range so that the convex-concave structure can be easily formed at the surface of the adsorbent. Here, the surface tension of the polymer belonging to Group A is larger than the surface tension of the polymer belonging to Group B.

Other polymers satisfying the preferable difference in surface tension therebetween can be exemplified in addition to the above-listed polymers. In this embodiment, however, the polymers are positioned at the surface of the adsorbent so as to adsorb the oil. In the practical adsorption of the oil, the polymers are immersed and dispersed in the water containing the oil. Therefore, if other polymers except the listed polymers are employed, the oil may not be almost adsorbed by the polymers because the polymers are substantially melted in the water.

Therefore, the above-listed polymers are preferable in view of the fundamental function of the adsorption of the oil in addition to the applied function of the formation of the convex-concave structure at the surface of the adsorbent.

In the listed polymer groups, since the polymers belonging to Group A exhibit hydrophobicity and the polymers belonging to Group B exhibit hydrophilicity, the polymers belonging to Group A mainly contribute to the adsorption of the oil and the polymers belonging to Group B mainly contribute to the dispersion in the water. In this embodiment, the adsorbent can satisfy both of the oil adsorption and the water dispersion. In the adsorption of the oil using the adsorbent, as a result, the adsorbent cannot be settled down in the water containing the oil and unevenly distributed on the surface of the water so that the adsorbent can be uniformly dispersed in the water. Therefore, the adsorbent can adsorb the oil sufficiently due to the polymer(s) belonging to Group A so that the oil can be easily and effectively recovered.

Particularly, it is desired that a polymer containing polystyrene as a main component (i.e., containing the styrene as a main structure) is selected from Group A and a polymer containing as a main component at least one selected from the group consisting of polymethyl methacrylate, polyacrylonitrile and polyvinyl butyral is selected from Group B. The combination of the desirable polymers selected from Groups A and B can exhibit the hydrophobicity and the hydrophilicity in addition to the above-described effect/function (i.e., the preferable difference range in surface tension), leading to good adsorption of the oil under the good dispersion of the adsorbent in the water.

(Manufacture of Adsorbent)

Then, the manufacturing method of the adsorbent in this embodiment will be described.

First of all, the inorganic particles or the like, the at least two kinds of polymers with the respective different surface tensions, e.g., at least one selected from Group A and at least one selected from Group B and a solvent are prepared and mixed to blend a predetermined slurry solution. Practically, the inorganic particles or the like and the polymers are dissolved in a solvent A.

The solvent A is not restricted only if the inorganic particles or the like and the polymers can be dissolved in the solvent A to form the slurry solution. Preferably, the solvent A is a polar solvent. Since the polar solvent has excellent hydrophilicity, the hydroxyl groups, which are relatively small amount, existing on the surfaces of the inorganic particles or the like have an affinity to the solvent A so that the inorganic particles are not aggregated and uniformly dispersed in the solvent A.

In this embodiment, the "hydrophilicity" means a free mixing for a water, and concretely, means the state where when a pure water and a given solvent at the same amount as one another are mixed at a temperature of 20° C. under 1 atm, the thus obtained mixed solution is maintained uniformly to the sight after the flow of the mixed solution is stopped.

If the solvent A is a non-polar solvent, the solvent A has hydrophobicity (in this case, the hydrophobicity means that water solubility is 10% or less) so that the inorganic particles or the like may be aggregated and not dispersed uniformly in the slurry solution. In this point of view, in the case that the adsorbents are produced by means of spray-dry as will be described below, some of the adsorbents may not contain the inorganic particles and other of the adsorbents may contain only the inorganic particles. As a result, since some of the adsorbents are manufactured as inferior adsorbents which are not suitable for the adsorption of the oil, it is required that the inferior adsorbents are removed through many processes. Moreover, since the compositions of the inferior adsorbents are not uniform one another, the composition analysis is equired to control the concentration of the slurry solution to the predetermined concentration of the intended solution so as to obtain the initial slurry solution in the reuse of the slurry solution, resulting in the complicated reuse process.

As the hydrophilic solvent, methanol, ethanol, n-propanol, isopropanol, acetone and tetrahydrofuran may be exemplified. Preferably, acetone and tetrahydrofuran are employed because these hydrophilic solvent can dissolve various polymers.

Then, the slurry solution is splay-dried. The splay-dry is conducted using splay drying method whereby particulate organic compounds can be obtained from a solvent containing the corresponding organic compounds through the removal of the organic solvent. In this embodiment, the organic compound means a resin composite particle constituted from a core made of the inorganic particle or the like and a polymer covering the core and corresponds to the adsorbent of the present invention.

According to the spray drying method, the average diameter in the secondary aggregations constituted from the primary particles can be adjusted by controlling the environmental temperature and spraying velocity in the implementation of the spray drying method. In the case of the use of the spray drying method, when the organic solvent is removed from the spaces of the aggregated primary particles and the polymers are precipitated on the aggregated primary particles, the attraction between the polymers is conducted due to the difference in surface tension of the polymers.

The spray drying method may be a one well known and commercially available, but may be conducted by using a disc type spray dryer, a pressurized nozzle type dryer or a two-fluid nozzle type dryer.

(Method for Recovering Oil)

Then, the recovering method of the oil using the adsorbent (s) will be described. The oil recovering operation separates the oil from the water containing the oil. Here, the "oil" means an organic compound, which is maintained as a liquid at ordinary temperature and poor solubility for the water, has a relatively large viscosity and a specific gravity smaller than the water from among the organic compounds mixed and dispersed in the water. Concretely, animal and vegetable oil, hydrocarbon and aromatic oil may be exemplified. The exemplified oils are typified by aliphatic acid glyceride, petroleum, higher alcohol. Since these oils have the respective characteristic functional groups, the polymers and the functional groups of the adsorbent can be selected commensurate with the characteristic functional groups of the oils.

First of all, the adsorbents are immersed and dispersed in the water containing the oil. As described above, since the effective surfaces of the adsorbents are increased by the formation of the convex-concave structures on the surfaces of the adsorbents and the polymers with hydrophilicity selected from Group A are formed on the cores of the adsorbents, the large amount of the oil can be adsorbed by the polymers (i.e., the adsorbents) originated from the affinity between the polymers and the oil and the convex-concave structure.

After the oil is adsorbed by the adsorbents, the adsorbents are separated from the water so as to separate the oil from the water. The separation of the adsorbents can be easily conducted by the settling using the force of gravity applied to the adsorbents or the centrifugal force using a cyclone separator. Moreover, when the inorganic particles or the like contain the magnetic substances, the separation of the adsorbents can be conducted by using the magnetic force of the magnetic substances.

The kind of the water to be treated in oil recovery is not restricted. Concretely, an industrial discharged water, a sewage water and a domestic waste water can be treated by the oil recovering method as described above. The concentration of the oil contained in the water to be treated is not restricted.

After the adsorbents adsorbs the oil and separated from the water, the adsorbents are washed by a solvent B so as to remove the oil therefrom. The solvent B must not dissolve the polymers of the adsorbents. Concretely, the solvent B is selected so as to satisfy the condition that the solubility of the polymers for the solvent B is set to 1000 mg/L or less.

The kind of the solvent B depends on the kinds of the covering polymers of the adsorbents and the surface modification of the adsorbents. For example, methanol, ethanol, n-propanol, isopropanol, butanol, isobutanol, hexyl alcohol, cyclohexanol, acetone, methyl ethyl ketone, methyl isobutyl ketone, methyl acetate, ethyl acetate, propyl acetate, butyl acetate, diethyl ether, isopropyl ether, dibutyl ether, tetrahydrofuran, dioxane, cyclohexane, chloroform, dimethylaniline, chlorofluorocarbon, n-hexane, cyclohexanone, toluene, xylene may be exemplified.

Among the exemplified solvent, a non-polar solvent is particularly preferable. Since the non-polar solvent has hydrophobicity and high affinity to the oil, the oil adsorbed to the adsorbents can be easily and effectively washed and removed. Moreover, if the non-polar solvent is employed, the damaged adsorbents can be easily separated and removed. Here, the "hydrophobicity" means that the water solubility is 10% or less and an intended substance such as the solvent is separated from the water. Particularly, hexane is preferable because hexane can exhibit higher solubility for the oil and is stable liquid at room temperature due to the higher boiling point of about 70° C. Therefore, hexane is easy to be handled and thus, preferable.

The solvent B may be an alcohol. In this case, the moisture content adhered or adsorbed on the surfaces of the adsorbents is likely to be substituted with the alcohol so that the impurities except the oil can be easily removed. As the alcohol, methanol and ethanol are preferable because these alcohols have the respective low boiling points.

This adsorbent reusing process can be conducted by charging the adsorbents in a column and flowing the solvent B in the column, for example. Alternatively, in the case that the adsorbents contains the respective magnetic substances, the adsorbents are input into a washing vessel while a large amount of the solvent B is also input into the washing vessel, and separated with a cyclone separator or by means of magnetic force.

Then, after the oil is removed from the adsorbents, the adsorbents are dried to remove the solvent B used for the washing of the adsorbents. In this case, if the adsorbents are not damaged and meet the standard, the adsorbents can be reused after the solvent B is perfectly removed. The drying process is not restricted, but may be conducted by disposing the adsorbents in a well-ventilated space, in a depressurized place or in a column where ventilation is conducted.

(Method for Recovering Organic Matter)

Then, the recovering method of the organic matter such as an organic compound will be described. Here, the "organic matter" does not mean the oil, but an organic compound or the like solved in the water. Concretely, the organic matter is typified by an organic compound such as a surface active agent, a pigment material or an odorous material. Since these organic compounds have the respective characteristic functional groups, the polymers and the functional groups of the adsorbent can be selected commensurate with the characteristic functional groups of the organic compound.

First of all, the adsorbents are immersed and dispersed in the water containing the organic matter. As described above, the effective surfaces of the adsorbents are increased by the formation of the convex-concave structures on the surfaces of the adsorbents. Since the organic matter is adsorbed to the surfaces of the polymers, the adsorption efficiency is enhanced as the surface area and the fine pore volume of the polymers, that is, the adsorbents are increased. In this point of view, the adsorbents are suitable for the adsorption of such an organic matter.

After the organic matter is adsorbed by the adsorbents, the adsorbents are separated from the water so as to separate the organic matter from the water. The separation of the adsorbents can be also conducted by the settling using the force of gravity applied to the adsorbents or the centrifugal force using a cyclone separator. Moreover, when the inorganic particles or the like contain the magnetic substances, the separation of the adsorbents can be conducted by using the magnetic force of the magnetic substances.

EXAMPLES

Then, the present invention will be described in reference with examples.

Example 1

Manufacture of Adsorbent

A polystyrene (100% of styrene) containing the styrene belonging to Group A as a main structure thereof was mixed with a polymethyl methacrylate (100% of methyl methacrylate) containing the methyl methacrylate belonging to Group B at a volume ratio of 9:1 (the volume ratio of the polymer containing the main structure belonging to Group B being 10 vol %) to form 6 parts by weight of the thus obtained mixed polymer, which was solved into 300 ml of tetrahydrofuran to form a solution. Then, 40 parts by weight of spherical magnetite particles with an average particle diameter of 800 nm (each specific surface area being 5.7 $m^2/g$) was dispersed in the solution to form a composition, which is sprayed using a mini spray dryer (trade name) (made by SIBATA SCIENTIFIC TECHNOLOGY LTD. , B-290 type) to form spherically aggregated resin composites, that is, adsorbent particles with an average secondary particle diameter of about 20 μm.

When some of the adsorbent particles were observed by means of AFM (atomic force microscope), it was turned out that the surfaces of the adsorbent particles were shaped in respective convex-concave forms due to the difference in surface tension between the polystyrene and the polymethyl methacrylate so that the adsorbent particles were formed porously. The average width and depth of the observed pores were about 50 nm and about 20 nm, respectively.

In order to confirm that the pores are formed by the mixed polymer, the adsorbent particles were solved in a solvent of tetrahydrofuran while the magnetite particles of the adsorbent particles were filtered and separated, thereby forming a solution, which was dropped off on the smooth surface of a silicon wafer to form a thin film by means of spin coating. The drying period of time was set to about 10 seconds. When the thin film was observed by means of AFM (atomic force microscope) in the same manner as described above, it was confirmed that the convex-concave structure with the pores of average width of about 300 nm and average depth of about 100 nm was formed at the thin film. In this way, since the pores were observed in the area where the magnetite particles were not contained, it was turned out that the pores are originated from the mixed polymer. When the pore volume of each of the adsorbent particles was measured by means of mercury penetration, the pore volume was 1.33 mL/g (containing the gaps between the adjacent core (magnetite) particles).

Adsorption of Oil

Then, 1 g of the adsorbent particles was measured in a 1 L stoppered Erlenmeyer flask and 200 ml of a water containing 500 μL of aliphatic hydrocarbon-based oil was added to the adsorbent particles of 1 g. In the thus obtained solution, the oil was adsorbed to the adsorbent particles by stirring. The adsorbent particles were dispersed in the solution under good condition. After the adsorbent particles were taken out of the Erlenmeyer flask into a flask using a magnet, 100 ml of a hexane was added to the adsorbent particles for the washing thereof through stirring to extract the oil. When the hexane was analyzed by using a gas chromatograph mass spectrometry so as to measure the amount of the oil adsorbed with the adsorbent particles, it was turned out that the amount of the adsorbed oil was 499.9 μL or more (not more than the detection limit of the amount of oil in water).

Then, the adsorbent particles were put in 10 ml of the hexane and stirred. When the adsorbent particles were taken out of the hexane by using the magnet and the hexane was analyzed, it was turned out that all of the adsorbed oil was washed and released. When the adsorbent particles were observed by means of AFM (atomic force microscope) after the release of the oil, it was turned out that the porous structures remain on the surfaces of the adsorbent particles due to the convex-concave structures thereon.

Then, after the adsorbent particles were washed, the adsorbent particles were put in a stainless vat and dried in a drafting machine for organic compound for 30 minutes so that it was turned out that all of the hexane was removed from the adsorbent particles. Thereafter, the adsorbent particles were treated by a dry type cyclone so that the small particles were able to be removed and the remaining particles were able to be recovered as good conditioned particles. When the thus obtained recovered adsorbent particles were put in 200 ml of the water containing 500 μL of the oil, it was turned out that the recovered adsorbent particles adsorbs (recovers) 499.9 μL or more of the oil.

Adsorption of Organic Matter (Organic Compound)

Then, 1 g of the adsorbent particles was measured in a 1 L stoppered Erlenmeyer flask and 200 ml of a water containing 500 μL of a dodecyl sodium sulfate was added to the adsorbent particles of 1 g. In the thus obtained solution, the dodecyl sodium sulfate was adsorbed to the adsorbent particles by stirring. After the adsorbent particles were taken out of the Erlenmeyer flask into a flask using a magnet, the remaining solution was analyzed by means of LC/MS (liquid chromatography mass spectrometry) so that it was turned out that about 82% of the dodecyl sodium sulfate was adsorbed by the adsorbent particles.

Example 2

Intended adsorbent particles were produced in the same manner as Example 1 except that a styrene (80%)/acrylic nitrile (20%) random copolymer belonging to Group A was employed instead of the polymethyl methacrylate (100% of methyl methacrylate) containing the methyl methacrylate belonging to Group B. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.33 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 70% for all of the dodecyl sodium sulfate while the dispersion of the adsorbent particles in the solution was slightly reduced.

Example 3

Intended adsorbent particles were produced in the same manner as Example 1 except that a styrene (20%)/acrylic nitrile (80%) random copolymer belonging to Group B was employed instead of the polymethyl methacrylate (100% of methyl methacrylate) containing the methyl methacrylate belonging to Group B. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.20 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 75% for all of the dodecyl sodium sulfate while the dispersion of the adsorbent particles in the solution was not reduced.

Example 4

Intended adsorbent particles were produced in the same manner as Example 1 except that a polylactic acid belonging to Group B was employed instead of the polymethyl methacrylate (100% of methyl methacrylate) containing the methyl methacrylate belonging to Group B and a chloroform was employed as a solvent instead of the tetrahydrofuran. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.27 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 71% for all of the dodecyl sodium sulfate while the dispersion of the adsorbent particles in the solution was not reduced.

Example 5

Intended adsorbent particles were produced in the same manner as Example 1 except that an ABS (Acrylonitrile-Butadiene-Styrene) resin belonging to Group A was employed instead of the polymethyl methacrylate (100% of methyl methacrylate) containing the methyl methacrylate belonging to Group B. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.15 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 72% for all of the dodecyl sodium sulfate while the dispersion of the adsorbent particles in the solution was slightly reduced.

Example 6

Intended adsorbent particles were produced in the same manner as Example 1 except that a styrene (55%) /butadiene (45%) random copolymer belonging to Group A was employed instead of the polymethyl methacrylate (100% of methyl methacrylate) containing the methyl methacrylate belonging to Group B under the condition that the volume ratio of the styrene (55%) /butadiene (45%) random copolymer to the polymethyl methacrylate belonging to Group B was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.31 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 90% for all of the dodecyl sodium sulfate while the dispersion of the adsorbent particles in the solution was slightly reduced.

Example 7

Intended adsorbent particles were produced in the same manner as Example 1 except that a styrene (81%)/isoprene (19%) random copolymer belonging to Group A was employed instead of the polystyrene belonging to Group A under the condition that the volume ratio of the styrene (81%)/isoprene (19%) random copolymer to the polymethyl methacrylate belonging to Group B was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.30 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 87% for all of the dodecyl sodium sulfate while the dispersion of the adsorbent particles in the solution was slightly reduced.

Example 8

Intended adsorbent particles were produced in the same manner as Example 1 except that an ABS resin belonging to Group A was employed instead of the polystyrene belonging to Group B under the condition that the volume ratio of the ABS resin to the polymethyl methacrylate belonging to Group B was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.11 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 88% for all of the dodecyl sodium sulfate while the dispersion of the adsorbent particles in the solution was slightly reduced.

Example 9

Intended adsorbent particles were produced in the same manner as Example 1 except that a styrene (80%)/acrylic niterile (20%) random copolymer belonging to Group A was employed instead of the polystyrene and a acetone was employed as a solvent instead of the tetrahydrofuran under the condition that the volume ratio of the styrene (80%)/acrylic niterile (20%) random copolymer to the polymethyl methacrylate belonging to Group B was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.03 mL/g (containing the gaps between the adjacent core (magnetite) particles). Then, it was turned out that the amount of the adsorbed (recovered) oil by the adsorbent particles was 499.9 μL or more and the amount of the adsorbed (recovered) dodecyl sodium sulfate by the adsorbent particles was about 79% for all of the dodecyl sodium sulfate while the dispersion of the adsorbent particles in the solution was slightly reduced.

Example 10

Intended adsorbent particles were produced in the same manner as Example 1 except that a polyvinyl butyral belonging to Group B was employed instead of the polystyrene belonging to Group A under the condition that the volume ratio of the polymethyl methacrylate to the polyvinyl butyral was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.16 mL/g (containing the gaps between the adjacent core (magnetite) particles). Then, it was turned out that the amount of the adsorbed (recovered) oil by the adsorbent particles was 499.9 µL or more and the amount of the adsorbed (recovered) dodecyl sodium sulfate by the adsorbent particles was about 85% for all of the dodecyl sodium sulfate while the dispersion of the adsorbent particles in the solution was slightly reduced.

Example 11

Intended adsorbent particles were produced in the same manner as Example 1 except that a polylactic acid belonging to Group B was employed instead of the polystyrene belonging to Group A under the condition that the volume ratio of the polymethyl methacrylate to the polylactic acid was set to 1:9. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were shaped in respective convex-concave forms. When the pore volume of each of the adsorbent particles was measured by means of mercury penetration, the pore volume was 1.09 mL/g (containing the gaps between the adjacent core (magnetite) particles). Then, it was turned out that the amount of the adsorbed (recovered) oil by the adsorbent particles was 499.9 µL or more and the amount of the adsorbed (recovered) dodecyl sodium sulfate by the adsorbent particles was about 88% for all of the dodecyl sodium sulfate while the dispersion of the adsorbent particles in the solution was slightly reduced.

Comparative Example 1

Intended adsorbent particles were produced in the same manner as Example 1 except that the polymethyl methacrylate belonging to Group B was not employed. Namely, the adsorbent particles contain only the polystyrene. Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were not shaped in respective convex-concave forms. When the pore volume of each of the adsorbent particles was measured by means of mercury penetration, the pore volume was 0.84 mL/g (containing the gaps between the adjacent core (magnetite) particles). Then, it was turned out that the amount of the adsorbed (recovered) oil by the adsorbent particles was 484.0 µL or more but the amount of the adsorbed (recovered) dodecyl sodium sulfate by the adsorbent particles was a low ratio of about 30% for all of the dodecyl sodium sulfate while the dispersion of the adsorbent particles in the solution was slightly reduced.

Comparative Example 2

Intended adsorbent particles were produced in the same manner as Example 1 so as to contain the styrene (20%)/acrylic nitrile 80%) random copolymer and not to contain the polystyrene belonging to Group A. Namely, the adsorbent particles contain only the Then, the oil adsorption and the organic component adsorption were carried out in the same manner as Example 1.

When some of the adsorbent particles were observed by means of AFM (atomic force microscope) in the same manner as Example 1, it was turned out that the surfaces of the adsorbent particles were not shaped in respective convex-concave forms. When the pore volume of each of the adsorbent particles was measured by means of mercury penetration, the pore volume was 0.78 mL/g (containing the gaps between the adjacent core (magnetite) particles). Then, it was turned out that the amount of the adsorbed (recovered) oil by the adsorbent particles was 484.0 µL, or more but the amount of the adsorbed (recovered) dodecyl sodium sulfate by the adsorbent particles was a low ratio of about 41% for all of the dodecyl sodium sulfate while the dispersion of the adsorbent particles in the solution was not reduced.

As apparent from Examples and Comparative Examples, it is turned out in Examples according to the present invention that the convex-concave structures are formed on the respective surfaces of the adsorbent particles so that the adsorbent particles can exhibit excellent oil absorptive capacity and organic compound absorptive capacity.

Although the concrete data for all of the elements belonging to Group A and Group B are not exhibited, it was confirmed that other elements belonging to Group A and Group B and not described in Examples can also exhibit the same oil absorptive capacity and organic matter (organic compound) absorptive capacity.

Although the present invention was described in detail with reference to the above examples, this invention is not limited to the above disclosure and every kind of variation and modification may be made without departing from the scope of the present invention.

What is claimed is:

1. An adsorbent, comprising:
   a core comprising at least one of an inorganic particle and a metallic particle;
   at least two kinds of polymers, which cover a surface of said core, with respective different surface tensions; and
   a convex-concave surface structure formed due to a difference in surface tension between said at least two kinds of polymers.

2. The adsorbent as set forth in claim 1, wherein said difference in surface tension between said at least two kinds of polymers is set within a range of 1 mN/m to 40 mN/m.

3. The adsorbent as set forth in claim 1, wherein said at least two kinds of polymers are constituted from corresponding polymers belonging to Group A and Group B:
   Group A: a polymer comprising as a main structure at least one selected from the group consisting of styrene, butadiene, isoprene, ethylene, and propylene
   Group B: at least one polymer selected from the group consisting of acrylic nitrile polymer, alkyl methacrylate polymer, alkyl acrylate polymer, polyacetal, polyvinyl butyral, polyamide, polyester, and polyvinyl ether.

4. The adsorbent as set forth in claim 3,
wherein a polymer comprising polystyrene as a main component is selected from Group A while a polymer containing as a main component at least one polymer selected from the group consisting of polymethyl methacrylate, acrylic nitrile and polyvinyl butyral is selected from Group B.

5. The adsorbent as set forth in claim 1,
wherein a width of said convex-concave surface structure is set within a range of 10 nm to 1000 nm and a depth of said convex-concave surface structure is set within a range of 10 nm to 1000 nm.

6. The adsorbent as set forth in claim 1,
wherein said at least one of said inorganic particle and said metallic particle comprises a magnetic substance.

7. The adsorbent as set forth in claim 1,
wherein said adsorbent is made by spray drying.

8. The adsorbent as set forth in claim 7,
wherein said adsorbent is made using a polar solvent.

9. A method for recovering an organic matter, comprising,
recovering an organic matter in a water using an adsorbent as set forth in claim 1.

10. A method for recovering an oil, comprising,
recovering an oil in a water using an adsorbent as set forth in claim 1.

11. A method for recovering an organic matter, comprising,
recovering an organic matter in a water using an adsorbent as set forth in claim 6.

12. A method for recovering an oil, comprising,
recovering an oil in a water using an adsorbent as set forth in claim 6.

13. A method for recovering an oil, comprising:
preparing an adsorbent comprising at least one of an inorganic particle and a metallic particle as a core, at least two kinds of polymers, which cover a surface of said core, with respective different surface tensions, and a convex-concave surface structure formed due to a difference in surface tension between said at least two kinds of polymers;
immersing and dispersing said adsorbent in water comprising an oil such that said oil is adsorbed by said adsorbent; and
releasing said adsorbent with said oil adsorbed from said water.

14. The method as set forth in claim 13, further comprising:
washing said adsorbent by a solvent after releasing said adsorbent; and
drying said adsorbent so as to remove said solvent.

15. The method as set forth in claim 13,
wherein said at least one of said inorganic particle and said metallic particle comprises a magnetic substance so that said adsorbent is released from said water by magnetic force.

16. The method as set forth in claim 14,
wherein said solvent is a non-polar solvent.

17. A method for recovering an organic matter, comprising:
preparing an adsorbent comprising at least one of an inorganic particle and a metallic particle as a core, at least two kinds of polymers, which cover a surface of said core, with respective different surface tensions, and a convex-concave surface structure formed due to a difference in surface tension between said at least two kinds of polymers;
immersing and dispersing said adsorbent in water comprising an organic matter such that said organic matter is adsorbed by said adsorbent; and
releasing said adsorbent with said organic matter adsorbed from said water.

18. The method as set forth in claim 17, further comprising:
washing said adsorbent by a solvent after releasing said adsorbent; and
drying said adsorbent so as to remove said solvent.

19. The method as set forth in claim 17,
wherein said at least one of said inorganic particle and said metallic particle comprises a magnetic substance so that said adsorbent is released from said water by means of magnetic force.

20. The method as set forth in claim 19,
wherein said solvent is a non-polar solvent.

* * * * *